US010245944B2

United States Patent
Takeda et al.

(10) Patent No.: US 10,245,944 B2
(45) Date of Patent: Apr. 2, 2019

(54) TANK AND METHOD OF MANUFACTURING TANK

(71) Applicant: Komatsu Ltd., Tokyo (JP)

(72) Inventors: Takuya Takeda, Tokyo (JP); Naoki Morimoto, Tokyo (JP)

(73) Assignee: Komatsu Ltd., Tokyo (JP)

( * ) Notice: Subject to any disclaimer, the term of this patent is extended or adjusted under 35 U.S.C. 154(b) by 88 days.

(21) Appl. No.: 15/510,467

(22) PCT Filed: Sep. 6, 2016

(86) PCT No.: PCT/JP2016/076209
§ 371 (c)(1),
(2) Date: Mar. 10, 2017

(87) PCT Pub. No.: WO2018/047240
PCT Pub. Date: Mar. 15, 2018

(65) Prior Publication Data
US 2018/0229602 A1    Aug. 16, 2018

(51) Int. Cl.
| | | |
|---|---|---|
| *B60K 15/077* | (2006.01) | |
| *B60P 3/22* | (2006.01) | |
| *F02M 37/00* | (2006.01) | |
| *B60K 15/03* | (2006.01) | |

(52) U.S. Cl.
CPC .......... *B60K 15/077* (2013.01); *B60P 3/2235* (2013.01); *F02M 37/0011* (2013.01); *B60K 2015/03032* (2013.01); *B60K 2015/0777* (2013.01)

(58) Field of Classification Search
CPC .......... B60K 15/077; B60K 2015/0344; B60K 2015/0775; B60K 2015/0777; B60P 3/2235; B65D 90/52; B64D 37/08

USPC .................................................. 220/563, 564
See application file for complete search history.

(56) References Cited

U.S. PATENT DOCUMENTS

| | | | | |
|---|---|---|---|---|
| 2002/0179611 A1* | 12/2002 | Hagenbuch | ........... | B60P 3/2235 |
| | | | | 220/563 |
| 2013/0284749 A1 | 10/2013 | Schwark et al. | | |

FOREIGN PATENT DOCUMENTS

| | | | | |
|---|---|---|---|---|
| CN | 1160650 A | 10/1997 | | |
| CN | 102975612 A | 3/2013 | | |
| DE | 683881 C | * 11/1939 | ............. | B64D 37/08 |
| JP | 59-110227 U | 7/1984 | | |
| JP | 04-297329 A | 10/1992 | | |
| JP | 09-263147 A | 10/1997 | | |
| JP | 2007-022399 A | 2/2007 | | |

(Continued)

OTHER PUBLICATIONS

International Search Report dated Nov. 15, 2016, issued for PCT/JP2016/076209.

*Primary Examiner* — Allan Stevens
(74) *Attorney, Agent, or Firm* — Locke Lord LLP (57) ABSTRACT

A tank mounted on a working vehicle is provided with an exterior member including a first plate unit, a second plate unit, a third plate unit, a fourth plate unit, a fifth plate unit, and a sixth plate unit, a first baffle plate joined to a first inner surface of the first plate unit, a second inner surface of the second plate unit, and a third inner surface of the third plate unit, and a second baffle plate joined to a fourth inner surface of the fourth plate unit, a fifth inner surface of the fifth plate unit, and a sixth inner surface of the sixth plate unit.

6 Claims, 8 Drawing Sheets

(56) References Cited

FOREIGN PATENT DOCUMENTS

JP 2009-143399 A 7/2009

* cited by examiner

TANK AND METHOD OF MANUFACTURING TANK

FIELD

The present invention relates to a tank and a method of manufacturing the tank.

BACKGROUND

A working vehicle includes various tanks for containing fluid such as a fuel tank and an operating oil tank. A plate member called as a baffle plate is often provided in the tank. The baffle plate has a function of preventing the fluid in the tank from excessively flowing when the working vehicle is accelerated or decelerated, and a function of increasing strength of the tank.

CITATION LIST

Patent Literatures

Patent Literature 1: Japanese Patent Application Laid-open No. 2009-143399

SUMMARY

Technical Problem

A tank is desired to have a function such as high durability, high reliability, cost saving, and weight saving. As for the high durability and high reliability, it is desired to inhibit a welding defect to reduce a risk of liquid leakage when manufacturing the tank by welding a plurality of members, for example. Development of a baffle plate capable of ensuring the high durability and high reliability and increasing strength of the tank without interfering with the weight saving is desired. For example, when a lightweight tank is mounted on a dump truck, low fuel consumption of the dump truck may be realized. The lightweight tank leads to a low cost. There is a case in which robot welding by a welding robot is difficult depending on a component configuration or a structure of the tank, so that hand welding by a worker should be performed. When there are a number of portions to be welded by the hand welding, productivity of the tank is deteriorated and the cost saving is interfered. Therefore, development of technology capable of inhibiting productivity of the tank from lowering and realizing the low cost is desired.

An object of a mode of the present invention is to provide a high-performance tank and a method of manufacturing the tank.

Solution to Problem

According to a first aspect of the present invention, a tank mounted on a working vehicle comprises: an exterior member including: a first plate unit; a second plate unit continuing to one end of the first plate unit; a third plate unit continuing to the other end of the first plate unit and opposed to the second plate unit with a gap therebetween; a fourth plate unit joined to an end of the second plate unit and an end of the third plate unit and opposed to the first plate unit with a gap therebetween; a fifth plate unit continuing to one end of the fourth plate unit and joined to the first plate unit, the second plate unit, and the third plate unit; and a sixth plate unit continuing to the other end of the fourth plate unit, joined to the first plate unit, the second plate unit, and the third plate unit, and opposed to the fifth plate unit with a gap therebetween, the exterior member including an inner space defined by a first inner surface of the first plate unit, a second inner surface of the second plate unit, a third inner surface of the third plate unit, a fourth inner surface of the fourth plate unit, a fifth inner surface of the fifth plate unit, and a sixth inner surface of the sixth plate unit; a first baffle plate joined to the first inner surface, the second inner surface, and the third inner surface; and a second baffle plate joined to the fourth inner surface, the fifth inner surface, and the sixth inner surface, wherein a surface of the first baffle plate is substantially orthogonal to the first inner surface, the second inner surface, and the third inner surface, a surface of the second baffle plate is substantially orthogonal to the fourth inner surface, the fifth inner surface, and the sixth inner surface, the first baffle plate includes a first end face joined to the first inner surface, a second end face joined to the second inner surface, a third end face joined to the third inner surface, and a first opposed surface opposed to the second baffle plate, the second baffle plate includes a fourth end face joined to the fourth inner surface, a fifth end face joined to the fifth inner surface, a sixth end face joined to the sixth inner surface, and a second opposed surface opposed to the first baffle plate, a central portion of the first opposed surface is farther away from the fourth inner surface than both ends of the first opposed surface in a direction orthogonal to the second inner surface, and a central portion of the second opposed surface is farther away from the first inner surface than both ends of the second opposed surface in a direction orthogonal to the fifth inner surface.

According to a second aspect of the present invention, a method of manufacturing a tank mounted on a working vehicle comprises: welding a first baffle plate to a first inner surface, a second inner surface, and a third inner surface of a first exterior member including a first plate unit including the first inner surface, a second plate unit continuing to one end of the first plate unit and including the second inner surface, and a third plate unit continuing to the other end of the first plate unit and including the third inner surface opposed to the second inner surface of the second plate unit with a gap therebetween; welding a second baffle plate to a fourth inner surface, a fifth inner surface, and a sixth inner surface of a second exterior member including a fourth plate unit including the fourth inner surface, a fifth plate unit continuing to one end of the fourth plate unit and including the fifth inner surface, and a sixth plate unit continuing to the other end of the fourth plate unit and including the sixth inner surface opposed to the fifth inner surface of the fifth plate unit with a gap therebetween; and welding the first exterior member to the second exterior member, wherein the first baffle plate includes a first end face joined to the first inner surface, a second end face joined to the second inner surface, a third end face joined to the third inner surface, and a first opposed surface opposed to the second baffle plate, the second baffle plate includes a fourth end face joined to the fourth inner surface, a fifth end face joined to the fifth inner surface, a sixth end face joined to the sixth inner surface, and a second opposed surface opposed to the first baffle plate, a central portion of the first opposed surface is farther away from the fourth inner surface than both ends of the first opposed surface in a direction orthogonal to the second inner surface, a central portion of the second opposed surface is farther away from the first inner surface than both ends of the second opposed surface in a direction orthogonal to the fifth inner surface, the first exterior member is welded to the first baffle plate such that a surface of the first baffle plate is substantially orthogonal to the first inner surface, the second inner surface, and the third inner surface, and the second exterior member is welded to the second baffle plate such that a surface of the second baffle plate is substantially orthogonal to the fourth inner surface, the fifth inner surface, and the sixth inner surface.

Advantageous Effects of Invention

According to the mode of the present invention, the high-performance tank and the method of manufacturing the tank are provided.

DESCRIPTION OF EMBODIMENTS

An embodiment according to the present invention is hereinafter described with reference to the drawings; however, the present invention is not limited to this. Components of the embodiment hereinafter described may be appropriately combined. There is a case in which a part of the components is not used.

In the following description, positional relationship of units is described by using terms such as a vertical direction, a lateral direction, and a longitudinal direction. The vertical direction is intended to mean a direction orthogonal to a ground contact surface of a wheel of a working vehicle which is in contact with a ground surface. The lateral direction is intended to mean a direction parallel to a rotational axis of the wheel which is not steered out of a plurality of wheels of the working vehicle. The lateral direction has the same meaning as a vehicle width direction of the working vehicle. The longitudinal direction is intended to mean a direction orthogonal to the lateral direction and the vertical direction.

An upward direction is intended to mean one direction in the vertical direction, the direction away from the ground contact surface of the wheel. A downward direction is intended to mean a direction opposite to the upward direction in the vertical direction, the direction approaching the ground contact surface of the wheel. A leftward direction is intended to mean one direction in the lateral direction, the direction to the left based on a driver of the working vehicle sitting on a seat when the seat on which the driver of the working vehicle sits and a steering wheel operated by the driver are provided. A rightward direction is intended to mean a direction opposite to the leftward direction in the lateral direction, the direction to the right based on the driver of the working vehicle sitting on the seat. A forward direction is intended to mean one direction in the longitudinal direction, the direction from the seat toward the steering wheel. A rearward direction is intended to mean a direction opposite to the forward direction in the longitudinal direction, the direction from the steering wheel toward the seat.

An upper portion is intended to mean a portion on an upper side of a member or a space in the vertical direction, the portion away from the ground contact surface of the wheel. A lower portion is intended to mean a portion on a lower side of the member or the space in the vertical direction, the portion near the ground contact surface of the wheel. A left portion is intended to mean a portion on a left side of the member or the space based on the driver of the working vehicle sitting on the seat. A right portion is intended to mean a portion on a right side of the member or the space based on the driver of the working vehicle sitting on the seat. A front portion is intended to mean a portion on a front side of the member or the space in the longitudinal direction. A rear portion is intended to mean a portion on a rear side of the member or the space in the longitudinal direction.

[Working Vehicle]

Figure 1:
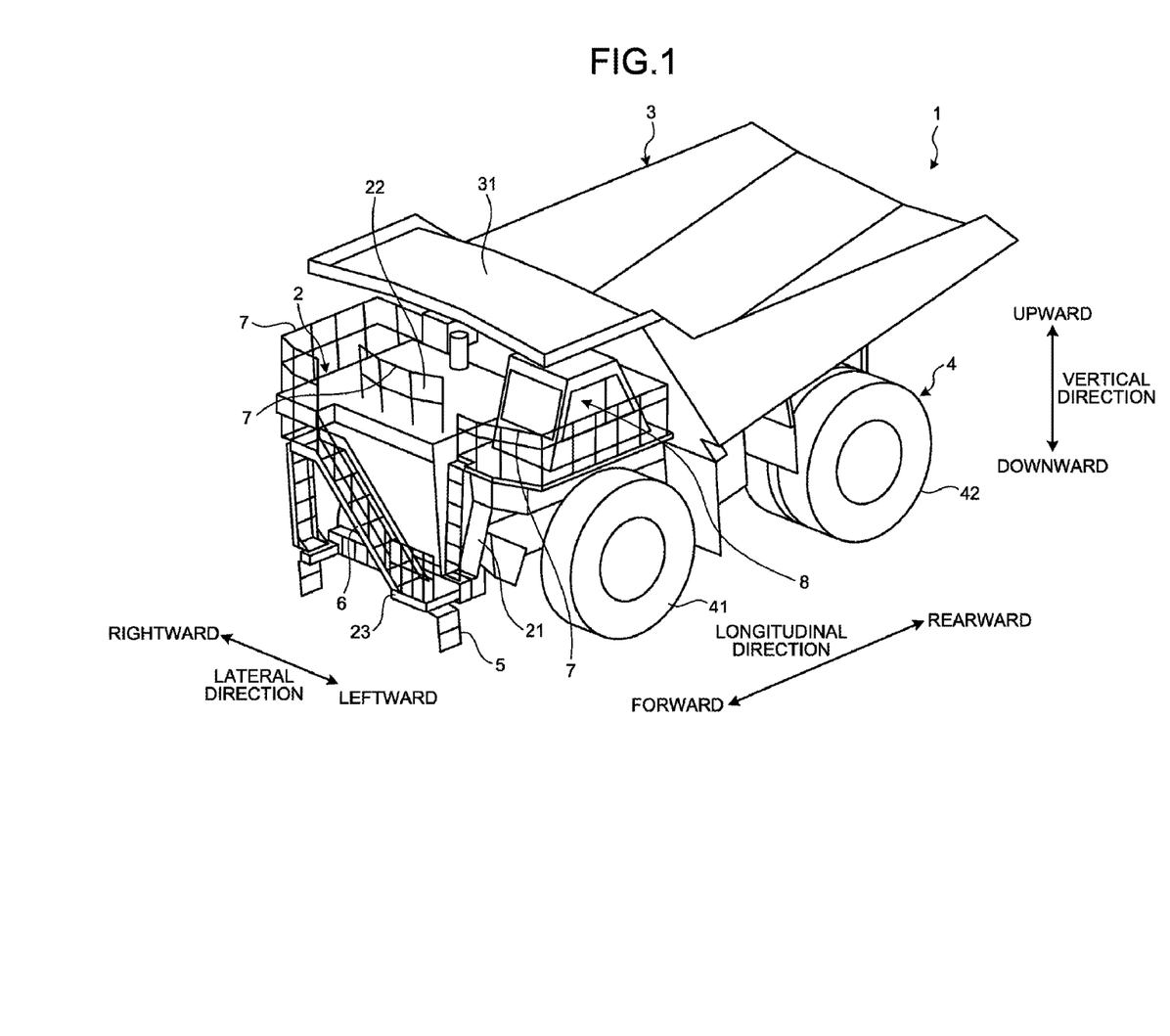
FIG. 1 is a perspective view illustrating an example of a working vehicle according to this embodiment.

FIG. 1 is a perspective view illustrating an example of a working vehicle 1 according to this embodiment. In this embodiment, an example in which the working vehicle 1 is a dump truck 1 is described. The dump truck 1 is a self-propelled off-road dump truck operating in a mining site of a mine. The dump truck 1 is of a rigid frame type. Meanwhile, the dump truck 1 may also be of an articulate type. The dump truck 1 may be a manned vehicle or an unmanned vehicle. When the dump truck 1 is the unmanned vehicle, this may be an autonomous vehicle or a vehicle traveling by remote control.

As illustrated in FIG. 1, the dump truck 1 is provided with a vehicle main body 2, a dump body 3 supported by the vehicle main body 2 on which a load is loaded, and a travel device 4 capable of moving the dump truck 1 while supporting the vehicle main body 2.

The vehicle main body 2 includes a frame 21, a floor deck 22 provided on an upper portion of the frame 21, and a lower deck 23 provided on a lower portion of the frame 21. The frame 21 supports the travel device 4.

A movable ladder 5 is provided on the lower deck 23. An oblique ladder 6 is provided between the lower deck 23 and the floor deck 22. A lower end of the oblique ladder 6 is connected to a left portion of the lower deck 23 and an upper end of the oblique ladder 6 is connected to a right portion of the floor deck 22. Handrails 7 are provided on a front side, a left side, and a right side of the floor deck 22.

The vehicle main body 2 includes a driving room 8. The driving room 8 is provided on a part of the floor deck 22. In this embodiment, the driving room 8 is provided on a left portion of the floor deck 22.

The driver gets on the driving room 8. The driving room 8 is equipped with the seat on which the driver sits. A plurality of operating devices arranged in the driving room 8 is operated by the driver. The operating devices arranged in the driving room 8 at least include the steering wheel. As described above, the forward direction is intended to mean the direction from the seat toward the steering wheel.

The dump body 3 is loaded with the load. The dump body 3 may be moved up and down by an actuator such as a hydraulic cylinder. The actuator arranged between the vehicle main body 2 and the dump body 3 may move the dump body 3 up and down. An attitude of the dump body 3 is adjusted to at least one of a loading attitude and a standing attitude by operation of the actuator. The loading attitude is intended to mean the attitude of the dump body 3 lowered the most within a movable range of the dump body 3 to be closest to the vehicle main body 2 to seat. The standing attitude is intended to mean the attitude of the dump body 3 raised the most within the movable range of the dump body 3 to be farthest from the vehicle main body 2. When the dump body 3 is in the loading attitude, the load is loaded on the dump body 3 and the dump truck 1 may travel. When the dump body 3 is in the standing attitude, the load is discharged from the dump body 3.

In this embodiment, the dump truck 1 is of a rear dump type; the dump body 3 is tilted rearward to discharge the load from the dump body 3. Meanwhile, the dump truck 1 may also be of a side dump type which tilts the dump body 3 leftward or rightward to discharge the load from the dump body 3.

The dump body 3 includes a protector 31. The protector 31 is a flange arranged on a front portion of the dump body 3. In the loading attitude, the protector 31 of the dump body 3 is arranged above the driving room 8.

The travel device 4 includes a front wheel 41 and a rear wheel 42. The rear wheel 42 is arranged behind the front wheel 41. The front wheels 41 are arranged on left and right sides of the vehicle main body 2. The rear wheels 42 are arranged on the left and right sides of the vehicle main body 2.

The travel device 4 is operated by power generated by a power generating device provided on the vehicle main body 2. The power generating device includes at least one of an internal-combustion engine such as a diesel engine and a motor.

The front wheel 41 rotates around a rotational axis. The rear wheel 42 rotates around a rotational axis. The rear wheel 42 rotates by the power generated by the power generating device, so that the travel device 4 travels. The front wheel 41 is steered by operation of the steering wheel by the driver. As described above, the lateral direction is intended to mean the direction parallel to the rotational axis of the wheel which is not steered out of a plurality of wheels of the working vehicle 1. In this embodiment, the lateral direction is intended to mean the direction parallel to the rotational axis of the rear wheel 42.

[Tank]

Figure 2:
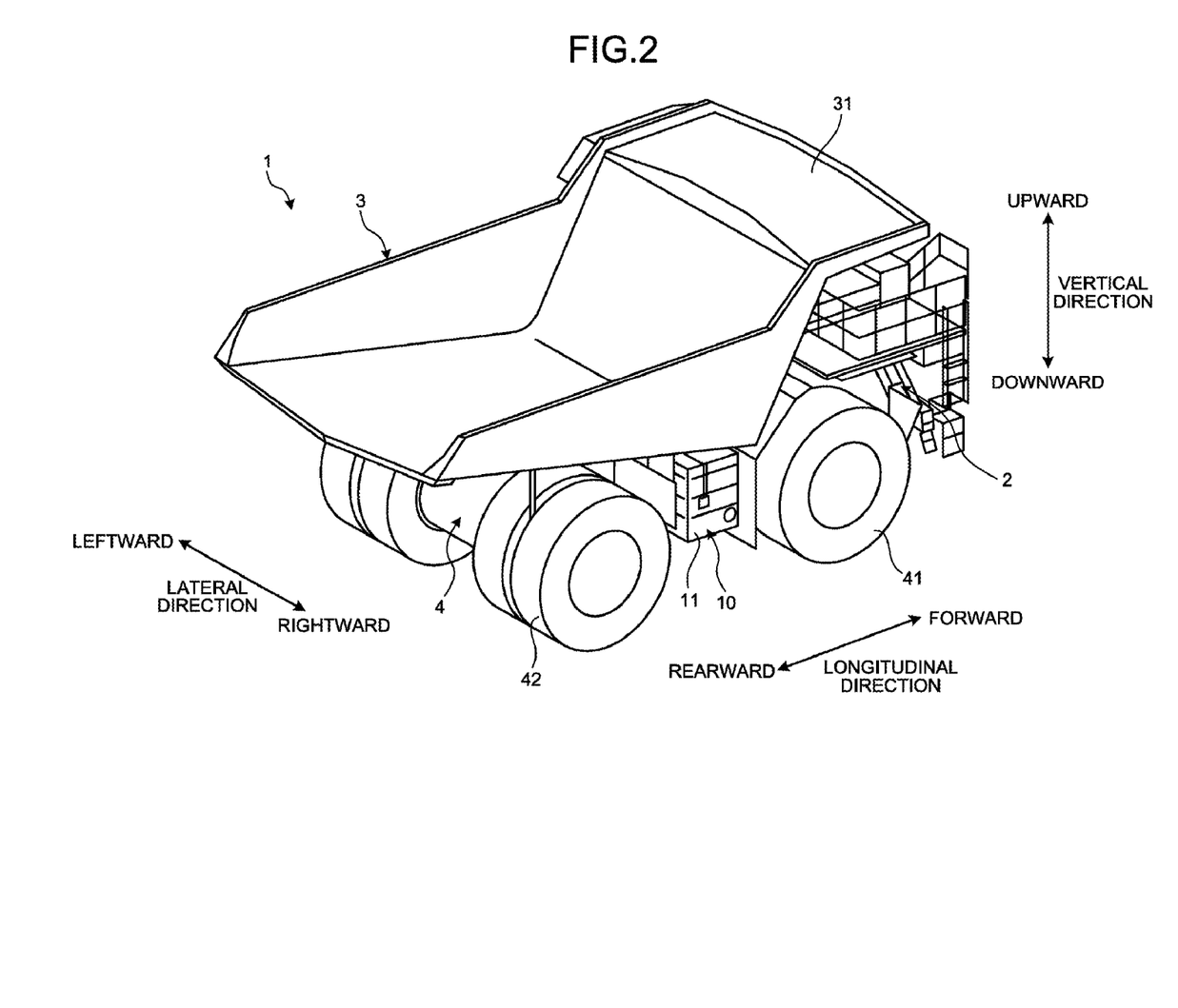
FIG. 2 is a perspective view illustrating an example of the working vehicle according to this embodiment.

As illustrated in FIG. 2, the dump truck 1 includes a tank 10 which contains fluid. The tank 10 is provided on a right portion of the vehicle main body 2. The tank 10 is provided on a central portion of the vehicle main body 2 in the longitudinal direction. The tank 10 is mounted on the frame 21 of the vehicle main body 2 by means of at least one of a connecting member and a fastening member.

In this embodiment, the tank 10 is a fuel tank which contains fuel being the fluid. The fuel in the tank 10 is supplied to the internal-combustion engine to be burned there. The tank 10 has a substantially rectangular parallelepiped outer shape.

Figure 3:
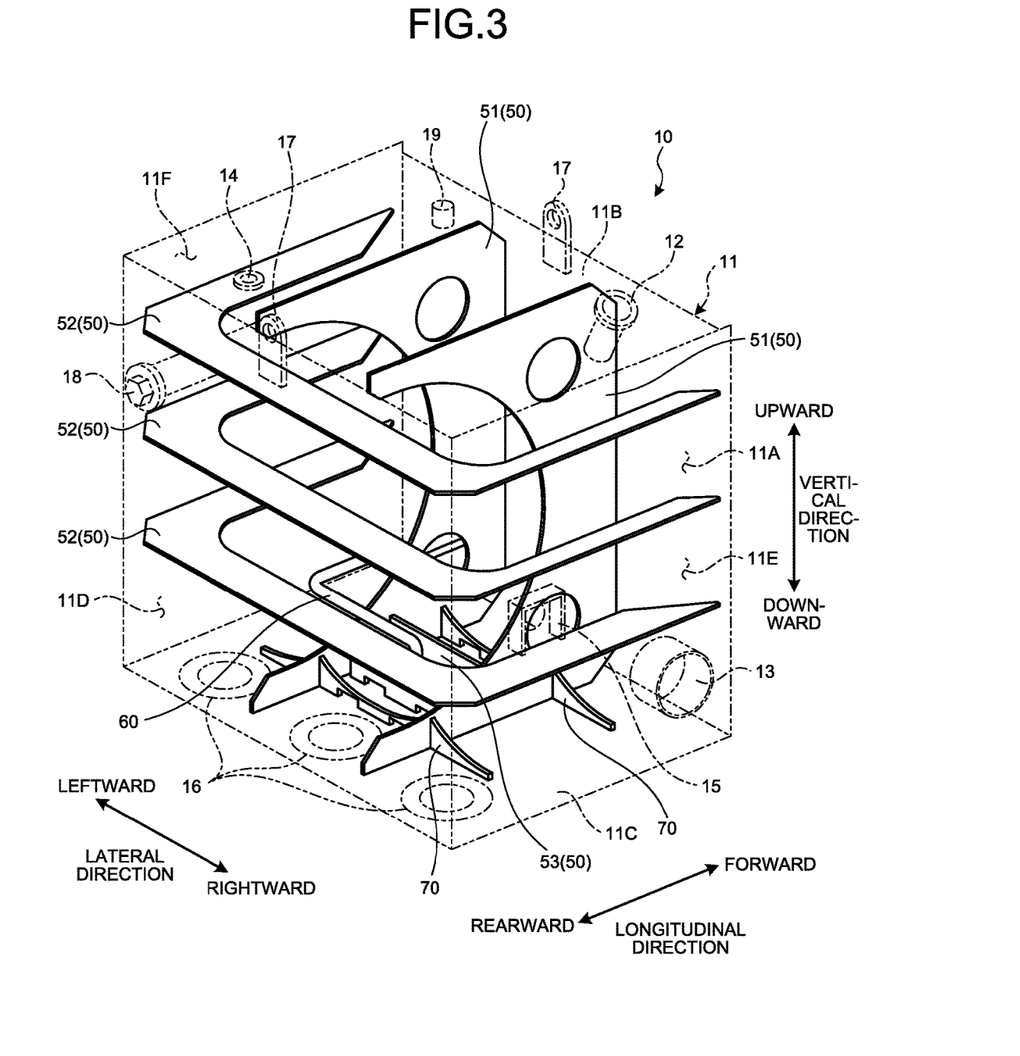
FIG. 3 is a perspective view illustrating an example of a tank according to this embodiment.

FIG. 3 is a perspective view illustrating an example of the tank 10 according to this embodiment. FIG. 3 is a perspective view such that an inner structure of the tank 10 is visible. As illustrated in FIG. 3, the tank 10 includes an exterior member 11 including an inner space and a plurality of baffle plates 50 provided within the exterior member 11. In FIG. 3, the exterior member 11 and the like is indicated by a dashed-two dotted line as a virtual line, and the baffle plate 50 and a supporting plate 70 are indicated by solid lines.

The exterior member 11 has a substantially rectangular parallelepiped outer shape. The exterior member 11 includes a first plate unit 11A including a side surface facing forward, a second plate unit 11B including an upper surface facing upward, a third plate unit 11C including a lower surface facing downward, a fourth plate unit 11D including a side surface facing rearward, a fifth plate unit 11E including a side surface facing rightward, and a sixth plate unit 11F including a side surface facing leftward. A steel plate is used, for example, as the exterior member 11.

The exterior member 11 includes a first replenishing port 12 and a second replenishing port 13. The tank 10 is replenished with the fuel through at least one of the first and second replenishing ports 12 and 13. The first replenishing port 12 is provided on the second plate unit 11B. The second replenishing port 13 is provided on the fifth plate unit 11E. More specifically, the first replenishing port 12 is provided on a front right portion of the second plate unit 11B. The second replenishing port 13 is provided on a front lower portion of the fifth plate unit 11E.

In this embodiment, the tank 10 is replenished with the fuel by at least one of a supplying nozzle inserted into the first replenishing port 12 and a pressure feeding device connected to the second replenishing port 13.

The supplying nozzle is handled by a worker, for example. The tank 10 may be supplied with the fuel from the supplying nozzle inserted into the first replenishing port 12.

The pressure feeding device capable of pressure feeding the fuel is connected to the second replenishing port 13 and the fuel is supplied from the pressure feeding device to the tank 10 by operation of the pressure feeding device. An exhaust port 14 for discharging gas in the inner space of the tank 10 is provided on a rear left portion of the second plate unit 11B. When the fuel is supplied to the tank 10 by the pressure feeding device and an amount of the fuel in the tank 10 increases, pressure of the gas in the inner space of the tank 10 rises. When the pressure in the inner space of the tank 10 rises above a prescribed value, the gas is discharged from the exhaust port 14. When the pressure in the inner space of the tank 10 rises above the prescribed value, the supply of the fuel by the pressure feeding device is stopped.

A remaining level meter 15 indicating a remaining level of the fuel in the tank 10 is provided on a rear portion of the fifth plate unit 11E. The worker visually checks the remaining level meter 15 from a lower side and a right side of the dump truck 1 to perform replenishing operation to the tank 10.

A drain 16 is provided on the third plate unit 11C. A plurality of drains 16 is provided in this embodiment. The drain 16 is an opening for discharging a foreign object or liquid in the tank 10. For example, after a welding process to be described later is performed, the foreign object in the inner space of the tank 10 is discharged from the drain 16. After the tank 10 is assembled by welding, the worker inserts a high-pressure cleaning nozzle into the drain 16 and injects cleaning solution into the tank 10 from the drain 16, thereby cleaning the inside of the tank 10. The foreign object and the cleaning solution are discharged from the drain 16. After the cleaning ends, the drain 16 is closed by a lid member. When the fuel in the tank 10 is discharged, the fuel is discharged from the drain 16.

The exterior member 11 also includes a first connecting member 17 and a second connecting member 18 to be connected to the frame 21 of the vehicle main body 2. The first connecting members 17 are provided on upper portions of the first plate unit 11A and the fourth plate unit 11D. The first connecting members 17 are provided on central portions of the first plate unit 11A and the fourth plate unit 11D in the lateral direction. The second connecting member 18 is provided on a left portion of the fourth plate unit 11D.

A return port 19 for returning the fuel which is not consumed by the internal-combustion engine to the tank 10 is provided on the second plate unit 11B. A return pipe (not illustrated) arranged in the inner space of the tank 10 is connected to the return port 19. The fuel which is not consumed by the internal-combustion engine is returned to the tank 10 through the return port 19 and the return pipe.

A suction pipe 60 is provided in the inner space of the tank 10. The suction pipe 60 supplies the fuel in the tank 10 to the internal-combustion engine. A suction port for sucking the fuel is provided on a tip end of the suction pipe 60. When the dump truck 1 tilts due to a slope on the ground surface and the tank 10 tilts in a state in which there is small fuel in the tank 10, the fuel in the tank 10 flows and the suction pipe 60 might have difficulty in sufficiently sucking the fuel in the tank 10. In this embodiment, the tip end of the suction pipe 60 is arranged on a central portion on an inner surface of the third plate unit 11C. Therefore, even when the dump truck 1 tilts due to the slope on the ground surface and the tank 10 tilts, the tip end of the suction pipe 60 is inhibited from separating from a liquid level of the fuel, so that the suction pipe 60 may smoothly suck the fuel in the tank 10.

The baffle plate 50 prevents the fuel in the tank 10 from excessively flowing and becoming imbalanced when the dump truck 1 is accelerated or decelerated. A steel plate is used, for example, as the baffle plate 50. For example, when the dump truck 1 is suddenly accelerated or decelerated in the state in which there is small fuel in the tank 10, the fuel in the tank 10 flows and the suction pipe 60 might have difficulty in sufficiently sucking the fuel in the tank 10. The baffle plate 50 inhibits the fuel in the tank 10 from flowing even when the dump truck 1 is suddenly accelerated or decelerated. Therefore, even when the dump truck 1 is suddenly accelerated or decelerated, the suction pipe 60 may smoothly suck the fuel in the tank 10.

The baffle plate 50 also serves as a rib for improving strength of the tank 10. For example, when the tank 10 is replenished with the fuel by the above-described pressure feeding device, the pressure in the inner space of the tank 10 rises. The baffle plate 50 supports the exterior member 11 to inhibit excessive stress from acting on the exterior member 11 to ensure the strength of an entire tank 10.

In this embodiment, the baffle plate 50 includes first, second, and third baffle plates 51, 52, and 53.

Figure 4:
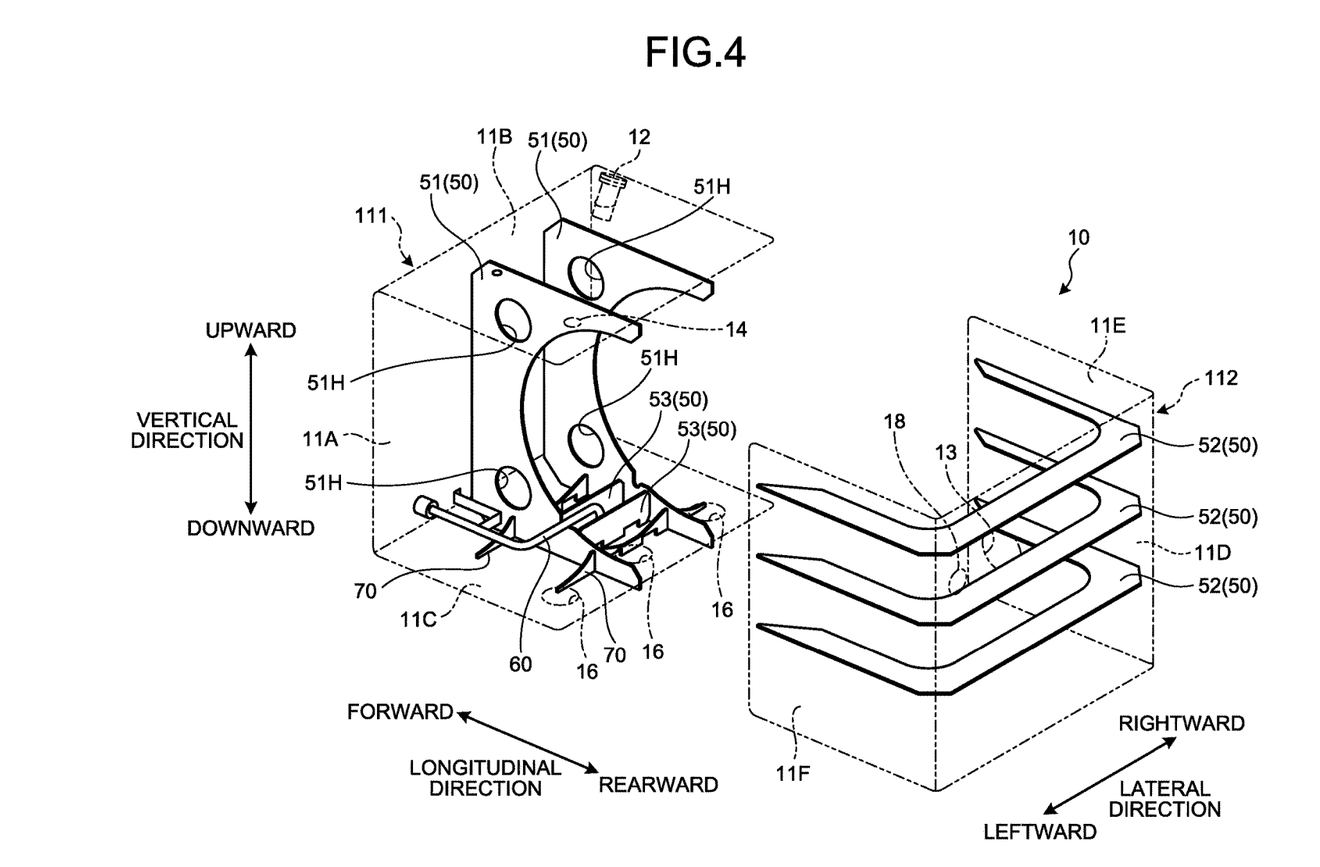
FIG. 4 is an exploded perspective view illustrating an example of the tank according to this embodiment.

FIG. 4 is an exploded perspective view illustrating an example of the tank 10 according to this embodiment. FIG. 4 is a perspective view such that the inner structure of the tank 10 is visible. As illustrated in FIGS. 3 and 4, the exterior member 11 includes the first plate unit 11A, the second plate unit 11B continuing to an upper end (one end) of the first plate unit 11A, and the third plate unit 11C continuing to a lower end (the other end) of the first plate unit 11A to be opposed to the second plate unit 11B with a gap therebetween.

The exterior member 11 also includes the fourth plate unit 11D, the fifth plate unit 11E continuing to a right end (one end) of the fourth plate unit 11D, and the sixth plate unit 11F continuing to a left end (the other end) of the fourth plate unit 11D to be opposed to the fifth plate unit 11E with a gap therebetween.

The fourth plate unit 11D is opposed to the first plate unit 11A with a gap therebetween. The fourth plate unit 11D is joined to a rear end of the second plate unit 11B and a rear end of the third plate unit 11C. The fifth plate unit 11E is joined to the first, second, and third plate units 11A, 11B, and 11C. The sixth plate unit 11F is joined to the first, second, and third plate units 11A, 11B, and 11C.

The first plate unit 11A includes a first inner surface facing the inner space of the exterior member 11. The second plate unit 11B includes a second inner surface facing the inner space of the exterior member 11. The third plate unit 11C includes a third inner surface facing the inner space of the exterior member 11. The fourth plate unit 11D includes a fourth inner surface facing the inner space of the exterior member 11. The fifth plate unit 11E includes a fifth inner surface facing the inner space of the exterior member 11. The sixth plate unit 11F includes a sixth inner surface facing the inner space of the exterior member 11.

The inner space of the exterior member 11 is defined by the first inner surface of the first plate unit 11A, the second inner surface of the second plate unit 11B, the third inner surface of the third plate unit 11C, the fourth inner surface of the fourth plate unit 11D, the fifth inner surface of the fifth plate unit 11E, and the sixth inner surface of the sixth plate unit 11F.

The exterior member 11 has a substantially rectangular parallelepiped shape. The first, second, third, fourth, fifth, and sixth inner surfaces have substantially square shapes.

The first inner surface of the first plate unit 11A is orthogonal to the second inner surface of the second plate unit 11B, the third inner surface of the third plate unit 11C, the fifth inner surface of the fifth plate unit 11E, and the sixth inner surface of the sixth plate unit 11F. The fourth inner surface of the fourth plate unit 11D is orthogonal to the second inner surface of the second plate unit 11B, the third inner surface of the third plate unit 11C, the fifth inner surface of the fifth plate unit 11E, and the sixth inner surface of the sixth plate unit 11F. The first inner surface of the first plate unit 11A and the second inner surface of the fourth plate unit 11D are opposed to each other with a gap therebetween.

As illustrated in FIG. 4, in this embodiment, the exterior member 11 is manufactured by joining a first exterior member 111 to a second exterior member 112.

The first exterior member 111 includes the first plate unit 11A and including the first inner surface, the second plate unit 11B continuing to the upper end (one end) of the first plate unit 11A and including the second inner surface, and the third plate unit 11C continuing to the lower end (the other end) of the first plate unit 11A including the third inner surface opposed to the second inner surface of the second plate unit 11B with a gap therebetween. The first exterior member 111 is manufactured by a bending process of one plate. That is to say, the first exterior member 111 obtained by integrating the first, second, and third plate units 11A, 11B, and 11C is used as one of components of the tank 10.

The second exterior member 112 includes the fourth plate unit 11D including the fourth inner surface, the fifth plate unit 11E continuing to the right end (one end) of the fourth plate unit 11D and including the fifth inner surface, and the sixth plate unit 11F continuing to the left end (the other end) of the fourth plate unit 11D and including the sixth inner surface opposed to the fifth inner surface of the fifth plate unit 11E with a gap therebetween. The second exterior member 112 is manufactured by the bending process of one plate. That is to say, the second exterior member 112 obtained by integrating the fourth, fifth, and sixth plate units 11D, 11E, and 11F is used as one of the components of the tank 10.

The first baffle plate 51 is joined to the first inner surface of the first plate unit 11A, the second inner surface of the second plate unit 11B, and the third inner surface of the third plate unit 11C. The first baffle plate 51 is welded to the first inner surface of the first plate unit 11A, the second inner surface of the second plate unit 11B, and the third inner surface of the third plate unit 11C. The first baffle plate 51 is arranged so as not to be in contact with the fourth, fifth, and sixth plate units 11D, 11E, and 11F.

The second baffle plate 52 is joined to the fourth inner surface of the fourth plate unit 11D, the fifth inner surface of the fifth plate unit 11E, and the sixth inner surface of the sixth plate unit 11F. The second baffle plate 52 is welded to the fourth inner surface of the fourth plate unit 11D, the fifth inner surface of the fifth plate unit 11E, and the sixth inner surface of the sixth plate unit 11F. The second baffle plate 52 is arranged so as not to be in contact with the first, second, and third plate units 11A, 11B, and 11C, and the first baffle plate 51.

When a surface perpendicular to a thickness direction of the first baffle plate 51 is made a surface of the first baffle plate 51, the surface of the first baffle plate 51 is substantially orthogonal to the first inner surface of the first plate unit 11A, the second inner surface of the second plate unit 11B, and the third inner surface of the third plate unit 11D.

When a surface perpendicular to a thickness direction of the second baffle plate 52 is made a surface of the second baffle plate 52, the surface of the second baffle plate 52 is substantially orthogonal to the fourth inner surface of the fourth plate unit 11D, the fifth inner surface of the fifth plate unit 11E, and the sixth inner surface of the sixth plate unit 11F.

The third baffle plate 53 is joined to the third inner surface of the third plate unit 11C. The third baffle plate 53 is welded to the third inner surface of the third plate unit 11C.

When a surface perpendicular to a thickness direction of the third baffle plate 53 is made a surface of the third baffle plate 53, the surface of the third baffle plate 53 is substantially orthogonal to the surface of the first baffle plate 51. The surface of the third baffle plate 53 is substantially orthogonal to the third inner surface of the third plate unit 11C.

The tip end of the suction pipe 60 is opposed to the third inner surface of the third plate unit 11C. The tip end of the suction pipe 60 includes the suction port capable of sucking the fuel. The suction port is opposed to the third inner surface. The third baffle plates 53 are arranged on both sides of the tip end of the suction pipe 60. In this embodiment, the third baffle plates 53 are arranged on the both sides of the tip end of the suction pipe 60 in the longitudinal direction.

The surface of the third baffle plate 53 is orthogonal to a virtual longitudinal axis elongated in the longitudinal direction. The dump truck 1 travels in the longitudinal direction orthogonal to the surface of the third baffle plate 53.

At least two first baffle plates 51 are provided so as to be opposed to each other with a gap therebetween. In this embodiment, the two first baffle plates 51 are provided in the lateral direction. The surface of the first baffle plate 51 is orthogonal to a virtual lateral axis extending in the lateral direction. In the lateral direction, the tip end of the suction pipe 60 and the third baffle plate 53 are arranged between the two first baffle plates 51.

In this embodiment, the supporting plate 70 which supports the first baffle plate 51 is provided. A steel plate is used, for example, as the supporting plate 70. The supporting plate 70 is joined to the third inner surface of the third plate unit 11C. The supporting plate 70 is welded to the third inner surface of the third plate unit 11C. The supporting plate 70 supports a lower portion of the first baffle plate 51. Two supporting plates 70 are provided in the longitudinal direction, for example. When a surface perpendicular to a thickness direction of the supporting plate 70 is made the surface of the supporting plate 70, the surface of the supporting plate 70 is orthogonal to the longitudinal axis. In the longitudinal direction, the tip end of the suction pipe 60 and the third baffle plate 53 are arranged between the two supporting plates 70.

At least two second baffle plates 52 are provided so as to be opposed to each other with a gap therebetween. In this embodiment, three second baffle plates 52 are provided in the vertical direction. In this embodiment, the second baffle plates 52 are arranged at a regular interval in the vertical direction. Meanwhile, the second baffle plates 52 may also be arranged at an irregular interval. The surface of the second baffle plate 52 is orthogonal to a virtual vertical axis extending in the vertical direction.

Figure 5:
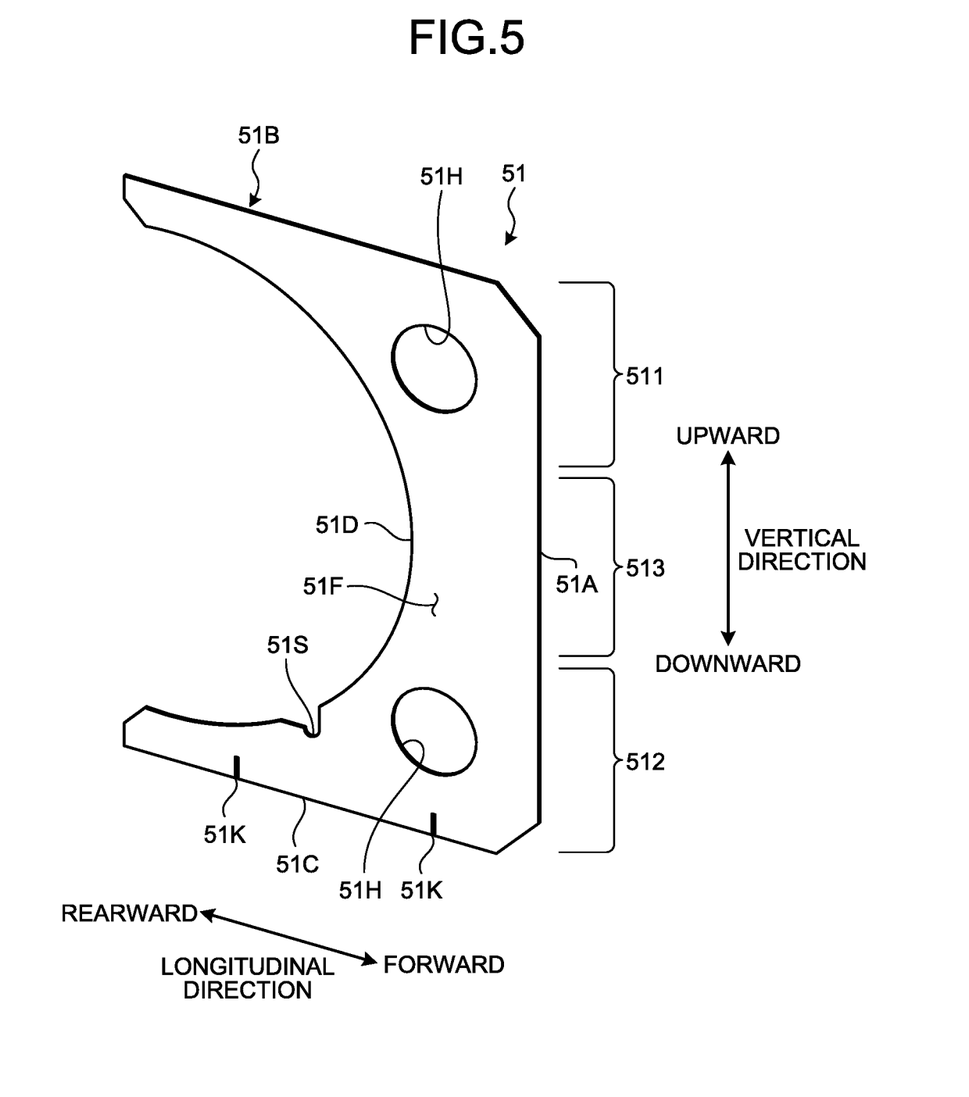
FIG. 5 is a perspective view illustrating an example of a first baffle plate according to this embodiment.

FIG. 5 is a perspective view illustrating an example of the first baffle plate 51 according to this embodiment. As illustrated in FIG. 5, the first baffle plate 51 includes an end face (first end face) 51A joined to the first inner surface of the first plate unit 11A, an end face (second end face) 51B joined to the second inner surface of the second plate unit 11B, an end face (third end face) 51C joined to the third inner surface of the third plate unit 11C, and an opposed surface (first opposed surface) 51D arranged so as to be opposed to the second baffle plate 52. The first baffle plate 51 includes a surface 51F orthogonal to the lateral axis. The longitudinal direction of the dump truck 1 is parallel to the surface 51F of the first baffle plate 51.

In this embodiment, the first baffle plate 51 includes a first portion 511 near the upper end (one end) of the first plate unit 11A, a second portion 512 near the lower end (the other end) of the first plate unit 11A, and a third portion 513 located between the first and second portions 511 and 512.

The first portion 511 includes the end face 51B joined to the second plate unit 11B. The second portion 512 includes the end face 51C connected to the third plate unit 11C. The third portion 513 is arranged between the first portion 511 and the second portion 512 in the vertical direction.

In the vertical direction orthogonal to the second inner surface of the second plate unit 11B, a central portion of the opposed surface 51D is farther away from the fourth inner surface of the fourth plate unit 11D than both ends of the opposed surface 51D.

In this embodiment, the opposed surface 51D is formed so as to be gradually away from the fourth inner surface of the fourth plate unit 11D forward from the upper end to the central portion. The opposed surface 51D is also formed so as to be gradually away from the fourth inner surface of the fourth plate unit 11D forward from the lower end to the central portion in the vertical direction. In this embodiment, in a plane orthogonal to the lateral axis, a line on which the opposed surface 51D intersects with the surface 51F, that is to say, an end of the opposed surface 51D has a substantially circular-arc shape.

A cutout 51K into which the supporting plate 70 is inserted is formed on the end face 51C. Two cutouts 51K are formed in the longitudinal direction.

A concave portion 51S in which the suction pipe 60 is arranged is formed on the opposed surface 51D. The concave portion 51S is formed on a lower portion of the opposed surface 51D.

An opening 51H is formed on each of the first and second portions 511 and 512. The opening 51H is a hole penetrating in the thickness direction of the first baffle plate 51. A lightweight first baffle plate 51 is realized by the opening 51H. Meanwhile, although two openings 51H are formed for one first baffle plate 51 in this embodiment, three or more openings 51H may also be formed. Diameters of a plurality of openings 51H are not necessarily the same.

Figure 6:
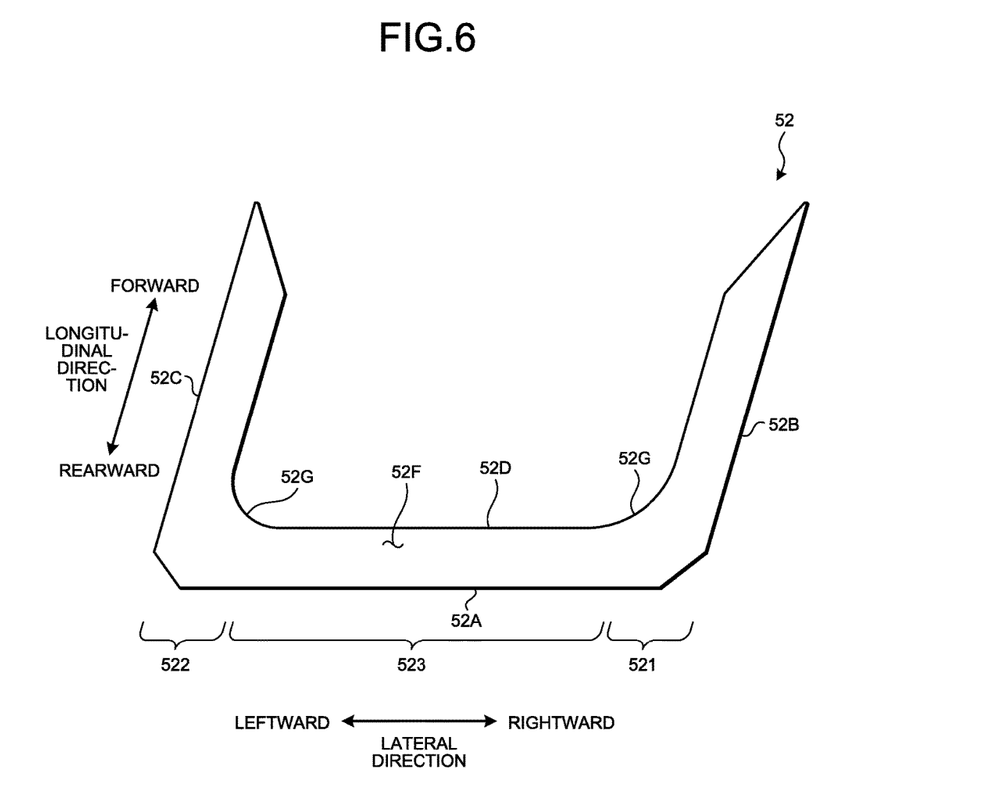
FIG. 6 is a perspective view illustrating an example of a second baffle plate according to this embodiment.

FIG. 6 is a perspective view illustrating an example of the second baffle plate 52 according to this embodiment. As illustrated in FIG. 6, the second baffle plate 52 includes an end face (fourth end face) 52A joined to the fourth inner surface of the fourth plate unit 11D, an end face (fifth end face) 52B joined to the fifth inner surface of the fifth plate unit 11E, an end face (sixth end face) 52C joined to the sixth inner surface of the sixth plate unit 11F, and an opposed surface (second opposed surface) 52D arranged so as to be opposed to the first baffle plate 51. The second baffle plate 52 also includes a surface 52F orthogonal to the vertical axis.

In this embodiment, the second baffle plate 52 includes a fourth portion 521 near the right end (one end) of the fourth plate unit 11D, a fifth portion 522 near the left end (the other end) of the fourth plate unit 11D, and a sixth portion 523 located between the fourth and fifth portions 521 and 522.

The fourth portion 521 includes the end face 52B joined to the fifth plate unit 11E. The fifth portion 522 includes the end face 52C joined to the sixth plate unit 11F. The sixth portion 523 is arranged between the fourth portion 521 and the fifth portion 522 in the lateral direction.

In the lateral direction orthogonal to the fifth inner surface of the fifth plate unit 11E, a central portion of the opposed surface 52D is farther away from the first inner surface of the first plate unit 11A than both ends of the opposed surface 52D.

In this embodiment, the opposed surface 52D includes curved portions 52G on ends in the lateral direction. The curved portion 52G on the right end of the opposed surface 52D is formed so as to be gradually away from the first inner surface of the first plate unit 11A rearward from the right end to the central portion in the lateral direction. The curved portion 52G on the left end of the opposed surface 52D is formed so as to be gradually away from the first inner surface of the first plate unit 11A rearward from the left end to the central portion in the lateral direction.

Figure 7:
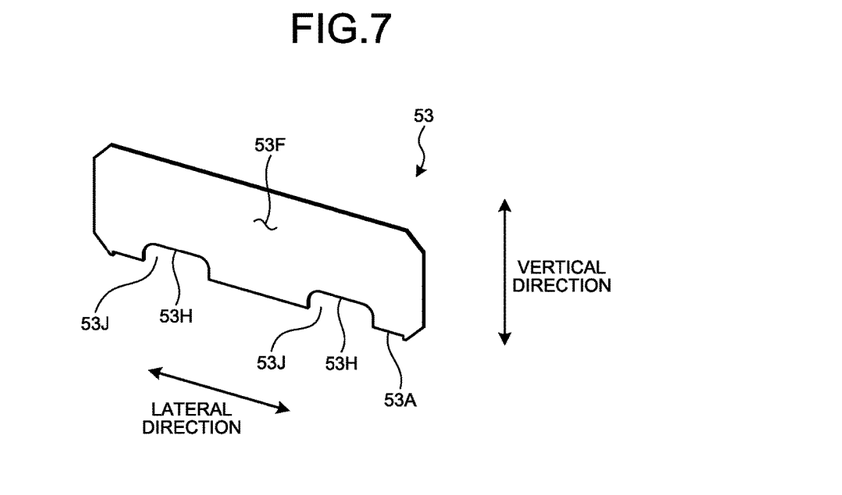
FIG. 7 is a perspective view illustrating an example of a third baffle plate according to this embodiment.

FIG. 7 is a perspective view illustrating an example of the third baffle plate 53 according to this embodiment. As illustrated in FIG. 7, the third baffle plate 53 includes an end face 53A joined to the third inner surface of the third plate unit 11C. The third baffle plate 53 includes a surface 53F orthogonal to the longitudinal axis.

A concave portion 53H is formed on the end face 53A. An inner surface of the concave portion 53H is a part of the end 53A. The inner surface of the concave portion 53H is opposed to the third inner surface of the third plate unit 11C with a gap therebetween in a state in which the end face 53A of the third baffle plate 53 is joined to the third inner surface of the third plate unit 11C. That is to say, an opening 53J is formed between the third baffle plate 53 and the third plate unit 11C in the concave portion 53H. The fuel in the inner space of the tank 10 may flow through the opening 53J between the third baffle plate 53 and the third plate unit 11C.

Figure 8:
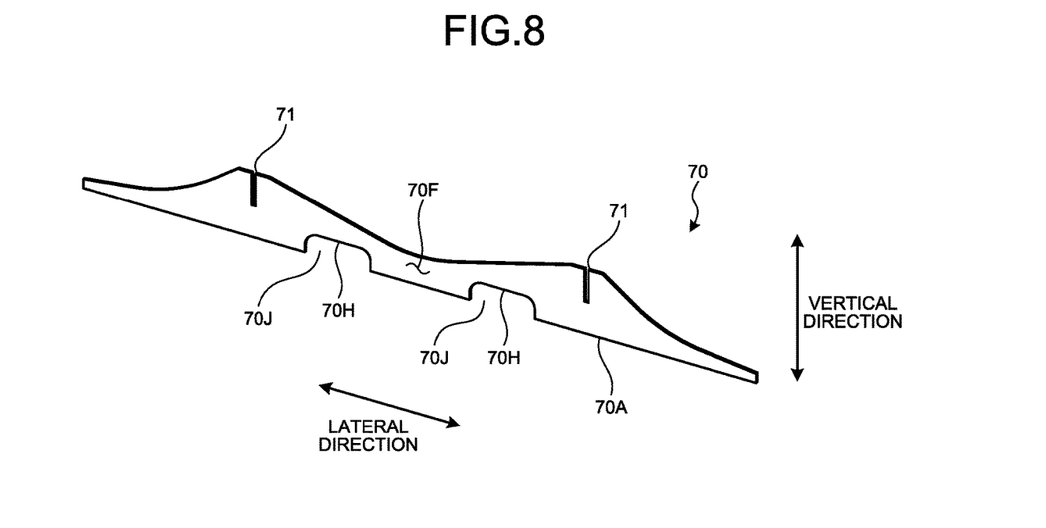
FIG. 8 is a perspective view illustrating an example of a supporting plate according to this embodiment.

FIG. 8 is a perspective view illustrating an example of the supporting plate 70 according to this embodiment. As illustrated in FIG. 8, the supporting plate 70 includes an end face 70A joined to the third inner surface of the third plate unit 11C. The supporting plate 70 also includes a surface 70F orthogonal to the longitudinal axis.

A cutout 71 into which the first baffle plate 51 is inserted is formed on the supporting plate 70. In this embodiment, the two first baffle plates 51 are used, so that two cutouts 71 are formed in the lateral direction.

A concave portion 70H is formed on the end face 70A. An inner surface of the concave portion 70H is opposed to the third inner surface of the third plate unit 11C with a gap therebetween in a state in which the end face 70A of the supporting plate 70 is joined to the third inner surface of the third plate unit 11C. That is to say, an opening 70J is formed between the supporting plate 70 and the third plate unit 11C in the concave portion 70H. The fuel in the inner space of the tank 10 may flow through the opening 70J between the supporting plate 70 and the third plate unit 11C.

[Method of Manufacturing]

Next, an example of a method of manufacturing the tank 10 according to this embodiment is described. As illustrated in FIG. 4, after the bending process is performed on the steel plate cut to have a predetermined dimension to manufacture the first and second exterior members 111 and 112, the third baffle plate 53 and the supporting plate 70 are welded to the third inner surface of the first exterior member 111.

After the third baffle plate 53 and the supporting plate 70 are welded to the third inner surface of the first exterior member 111, the first baffle plate 51 is welded to the first, second, and third inner surfaces of the first exterior member 111. The first exterior member 111 and the first baffle plate 51 are welded such that the surface 51F of the first baffle plate 51 is substantially orthogonal to the first, second, and third inner surfaces.

The second baffle plate 52 is welded to the fourth, fifth, and sixth inner surfaces of the second exterior member 112. The second exterior member 112 and the second baffle plate 52 are welded such that the surface of the second baffle plate 52 is substantially orthogonal to the fourth, fifth, and sixth inner surfaces.

After the first exterior member 111 is welded to the first baffle plate 51 and the second exterior member 112 is welded to the second baffle plate 52, the first exterior member 111 and the second exterior member 112 are welded to be integrated.

Figure 9:
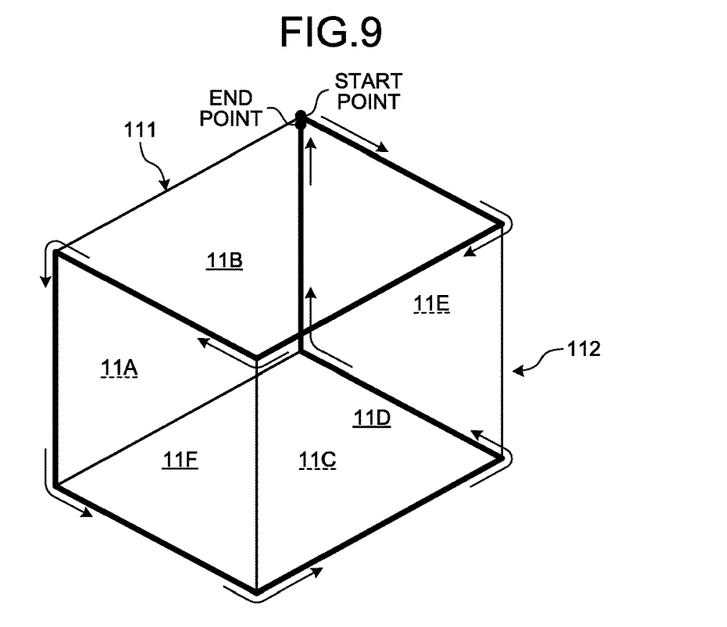
FIG. 9 is a view schematically illustrating an example of a method of welding a first exterior member and a second exterior member according to this embodiment.

FIG. 9 is a view schematically illustrating an example of a method of welding the first and second exterior members 111 and 112 according to this embodiment. A thin line found in FIG. 9 indicates a bending line in the bending process of the first or second exterior member 111 or 112 and a thick line indicates a welding line at a welding step. In a state in which the ends of the first, second, and third plate units 11A, 11B, and 11C of the first exterior member 111 and the ends of the fourth, fifth, and sixth plate units 11D, 11E, and 11F of the second exterior member 112 are brought into contact with one another, the welding of the first exterior member 111 and the second exterior member 112 is performed from an outer side of the exterior member 11 in the order indicated by an arrow in FIG. 9. According to this embodiment, the first exterior member 111 and the second exterior member 112 may be joined by so-called one-stroke sketch welding as indicated by the arrow in FIG. 9. That is to say, according to this embodiment, portions to be welded may be welded by one welding and the welding and a heat input of the already welded portion is inhibited.

[Action and Effect]

As described above, according to this embodiment, the first baffle plate 51 is sufficiently fixed to the first exterior member 111 and the second baffle plate 52 is sufficiently fixed to the second exterior member 112. The first exterior member 111 and the first baffle plate 51 are strongly fixed to each other by arc welding and the like. Similarly, the second exterior member 112 and the second baffle plate 52 are strongly fixed to each other by arc welding and the like. Therefore, the function as the rib of the first and second baffle plates 51 and 52 is sufficiently exerted and the strength of the tank 10 may be improved.

In this embodiment, the central portion of the opposed surface 51D of the first baffle plate 51 is farther away from the fourth inner surface of the fourth plate unit 11D than the both ends of the opposed surface 51D in the vertical direction, and the central portion of the opposed surface 52D of the second baffle plate 52 is farther away from the first inner surface of the first plate unit 11A than the both ends of the opposed surface 52D in the lateral direction. Therefore, the lightweight tank 10 is realized and a cost thereof is decreased. The strength of the tank 10 may be ensured without interfering with weight saving by the first and second baffle plates 51 and 52 having the shapes according to this embodiment.

Figure 10:
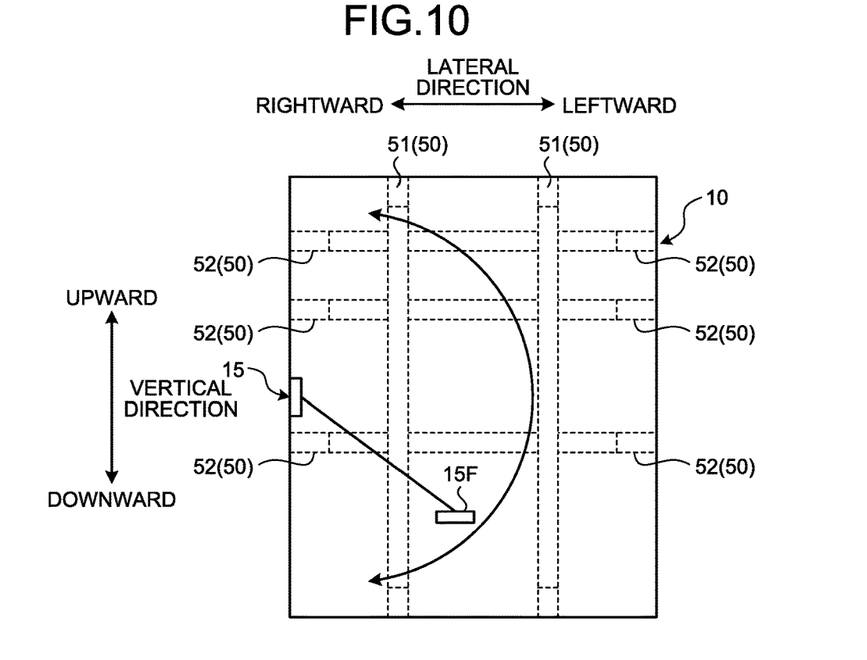
FIG. 10 is a view schematically illustrating an example of the tank according to this embodiment.

FIG. 10 schematically illustrates positional relationship between the remaining level meter 15 of the tank 10 and the first and second baffle plates 51 and 52. According to this embodiment, a large space is formed between the opposed surface 51D of the first baffle plate 51 and the opposed surface 52D of the second baffle plate 52. Therefore, as illustrated in FIG. 10, when the remaining level meter 15 of the tank 10 is of a float type including a float 15F floating on the fuel, the float 15F moves in the large space and the float 15F does not interfere with the first and second baffle plates 51 and 52. Therefore, the movement of the float 15F is not disturbed by the first and second baffle plates 51 and 52, the float 15F smoothly moves, and the remaining level meter 15 may precisely indicate a remaining level of the fuel.

According to this embodiment, after the first exterior member 111 is welded to the first baffle plate 51 and the second exterior member 112 is welded to the second baffle plate 52, the first exterior member 111 and the second exterior member 112 are welded. The worker may weld the first exterior member 111 to the first baffle plate 51, and the second exterior member 112 to the second baffle plate 52 with excellent workability. As described with reference to FIG. 9, the first exterior member 111 may be welded to the second exterior member 112 from the outer side of the exterior member 11. According to this, the first exterior member 111 may be efficiently joined to the second exterior member 112 by robot welding by a welding robot. The welding line in the welding of the first exterior member 111 and the second exterior member 112 is drawn by one-stroke sketch. Therefore, the welding and heat input of the already welded portion is inhibited, so that a welding defect is inhibited from occurring, and a risk of liquid leakage from the tank 10 is reduced.

As described above, according to this embodiment, the tank 10 with higher performance including high durability, high reliability, cost saving, weight saving and the like may be realized.

According to this embodiment, the third baffle plate 53 is provided. The tip end of the suction pipe 60 is enclosed by the two first baffle plates 51 and the two third baffle plates 53. Therefore, the excessive flow of the fuel due to the acceleration or deceleration of the dump truck 1 is prevented around the tip end of the suction pipe 60 and the suction pipe 60 may stably suck the fuel.

The third baffle plate 53 includes the concave portion 53H. The opening through which the fuel may flow is formed between the third baffle plate 53 and the third plate unit 11C by the concave portion 53H. Therefore, the fuel is inhibited from continuingly staying around the tip end of the suction pipe 60.

Meanwhile, the tank 10 is the fuel tank in the above-described embodiment. The tank 10 may also be an oil tank which contains oil (operating oil) for operating hydraulic equipment.

Meanwhile, the working vehicle 1 is the dump truck in the above-described embodiment. The working vehicle 1 may be an excavator including a lower traveling body, an upper swing body, and a working machine, a wheel loader, or a bulldozer.

Although this embodiment is described above, this embodiment is not limited by the above-described contents. The above-described components include a component easily conceived of by one skilled in the art, the substantially same component, and a so-called equivalent component. Furthermore, the above-described components may be appropriately combined. Furthermore, it is also possible to variously omit, replace, and change the components without departing from the gist of this embodiment.

REFERENCE SIGNS LIST

1 dump truck (working vehicle)
2 vehicle main body
3 dump body
4 travel device
5 movable ladder
6 oblique ladder
7 handrail
8 driving room
10 tank
11 exterior member
11A first plate unit
11B second plate unit
11C third plate unit
11D fourth plate unit
11E fifth plate unit
11F sixth plate unit
12 first replenishing port
13 second replenishing port
14 discharge port
15 remaining level meter
15F float
16 drain
17 first connecting member
18 second connecting member
19 return port
21 frame
22 floor deck
23 lower deck
31 protector
41 front wheel
42 rear wheel
50 baffle plate
51 first baffle plate
51A end face
51B end face
51C end face
51D opposed surface 51F surface
51H opening
51K cutout
51S concave portion
52 second baffle plate
52A end face
52B end face
52C end face
52D opposed surface
52F surface
53 third baffle plate
53A end face
53F surface
53H concave portion
60 suction pipe
70 supporting plate
70A end face
70F surface
70H concave portion
71 cutout
111 first exterior member
112 second exterior member
511 first portion
512 second portion
513 third portion

The invention claimed is:

1. A tank mounted on a working vehicle comprising:
an exterior member including:
a first plate unit;
a second plate unit continuing to one end of the first plate unit;
a third plate unit continuing to the other end of the first plate unit and opposed to the second plate unit with a gap therebetween;
a fourth plate unit joined to an end of the second plate unit and an end of the third plate unit and opposed to the first plate unit with a gap therebetween;
a fifth plate unit continuing to one end of the fourth plate unit and joined to the first plate unit, the second plate unit, and the third plate unit; and
a sixth plate unit continuing to the other end of the fourth plate unit, joined to the first plate unit, the second plate unit, and the third plate unit, and opposed to the fifth plate unit with a gap therebetween, the exterior member including an inner space defined by a first inner surface of the first plate unit, a second inner surface of the second plate unit, a third inner surface of the third plate unit, a fourth inner surface of the fourth plate unit, a fifth inner surface of the fifth plate unit, and a sixth inner surface of the sixth plate unit;
a first baffle plate joined to the first inner surface, the second inner surface, and the third inner surface; and
a second baffle plate joined to the fourth inner surface, the fifth inner surface, and the sixth inner surface, wherein
a surface of the first baffle plate is orthogonal to the first inner surface, the second inner surface, and the third inner surface,
a surface of the second baffle plate is orthogonal to the fourth inner surface, the fifth inner surface, and the sixth inner surface,
the first baffle plate includes a first end face joined to the first inner surface, a second end face joined to the second inner surface, a third end face joined to the third inner surface, and a first opposed surface opposed to the second baffle plate,
the second baffle plate includes a fourth end face joined to the fourth inner surface, a fifth end face joined to the fifth inner surface, a sixth end face joined to the sixth inner surface, and a second opposed surface opposed to the first baffle plate,
a central portion of the first opposed surface is farther away from the fourth inner surface than both ends of the first opposed surface in a direction orthogonal to the fourth inner surface, and
a central portion of the second opposed surface is farther away from the first inner surface than both ends of the second opposed surface in a direction orthogonal to the first inner surface.

2. The tank according to claim 1, comprising:
a suction pipe including a tip end including a suction port opposed to the third inner surface; and
third baffle plates joined to the third inner surface, wherein a surface of each of the third baffle plates is orthogonal to the surface of the first baffle plate, and the third baffle plates are arranged on two sides of the tip end of the suction pipe.

3. The tank according to claim 2, wherein at least two first baffle plates are provided so as to be opposed to each other with a gap therebetween, and the tip end of the suction pipe and the third baffle plates are arranged between the two first baffle plates.

4. The tank according to claim 2, wherein a longitudinal direction of the working vehicle is parallel to the surface of the first baffle plate.

5. The tank according to claim 3, wherein a longitudinal direction of the working vehicle is parallel to the surface of the first baffle plate.

6. A method of manufacturing a tank mounted on a working vehicle comprising:
welding a first baffle plate to a first inner surface, a second inner surface, and a third inner surface of a first exterior member including a first plate unit including the first inner surface, a second plate unit continuing to one end of the first plate unit and including the second inner surface, and a third plate unit continuing to the other end of the first plate unit and including the third inner surface opposed to the second inner surface of the second plate unit with a gap therebetween;
welding a second baffle plate to a fourth inner surface, a fifth inner surface, and a sixth inner surface of a second exterior member including a fourth plate unit including the fourth inner surface, a fifth plate unit continuing to one end of the fourth plate unit and including the fifth inner surface, and a sixth plate unit continuing to the other end of the fourth plate unit and including the sixth inner surface opposed to the fifth inner surface of the fifth plate unit with a gap therebetween; and
welding the first exterior member to the second exterior member, wherein
the first baffle plate includes a first end face joined to the first inner surface, a second end face joined to the second inner surface, a third end face joined to the third inner surface, and a first opposed surface opposed to the second baffle plate,
the second baffle plate includes a fourth end face joined to the fourth inner surface, a fifth end face joined to the fifth inner surface, a sixth end face joined to the sixth inner surface, and a second opposed surface opposed to the first baffle plate,
a central portion of the first opposed surface is farther away from the fourth inner surface than both ends of the first opposed surface in a direction orthogonal to the fourth inner surface, a central portion of the second opposed surface is farther away from the first inner surface than both ends of the second opposed surface in a direction orthogonal to the first inner surface, the first exterior member is welded to the first baffle plate such that a surface of the first baffle plate is orthogonal to the first inner surface, the second inner surface, and the third inner surface, and the second exterior member is welded to the second baffle plate such that a surface of the second baffle plate is orthogonal to the fourth inner surface, the fifth inner surface, and the sixth inner surface.

\* \* \* \* \*